United States Patent
Berndtson et al.

(10) Patent No.: US 11,938,853 B2
(45) Date of Patent: Mar. 26, 2024

(54) MULTI-ACTUATOR CAPABLE HEADREST

(71) Applicant: GM Global Technology Operations LLC, Detroit, MI (US)

(72) Inventors: John J. Berndtson, Grosse Pointe Woods, MI (US); David Wayne Milodrowski, Clinton Township, MI (US); Obert Burch, Royal Oak, MI (US); Joshua Miguel Rivera Torres, Clinton Township, MI (US); Edeena Alicia Reader, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 17/510,737

(22) Filed: Oct. 26, 2021

(65) Prior Publication Data

US 2023/0126292 A1     Apr. 27, 2023

(51) Int. Cl.
  *B60N 2/856* (2018.01)
  *B60N 2/853* (2018.01)
  *B60N 2/894* (2018.01)
  *B60N 2/829* (2018.01)
  *B60N 2/897* (2018.01)

(52) U.S. Cl.
  CPC ............ *B60N 2/856* (2018.02); *B60N 2/853* (2018.02); *B60N 2/894* (2018.02); *B60N 2/829* (2018.02); *B60N 2/897* (2018.02)

(58) Field of Classification Search
  None
  See application file for complete search history.

(56) References Cited

U.S. PATENT DOCUMENTS

| | | | |
|---|---|---|---|
| 7,118,171 B2 | 10/2006 | Fowler et al. | |
| 8,459,744 B2 * | 6/2013 | Sayama | B60N 2/844 297/410 |
| 2001/0002764 A1 | 6/2001 | Fischer et al. | |
| 2010/0078972 A1 * | 4/2010 | Sayama | B60N 2/3011 297/408 |
| 2011/0101738 A1 | 5/2011 | Jensen | |

(Continued)

FOREIGN PATENT DOCUMENTS

WO     2018202970 A1     11/2018

OTHER PUBLICATIONS

German Application No. 10 2022 123 173.9 filed Sep. 12, 2022; German Office Action dated Jul. 28, 2023; 4 pages.

*Primary Examiner* — David E Allred
(74) *Attorney, Agent, or Firm* — CANTOR COLBURN LLP

(57) ABSTRACT

A multi-actuator capable vehicle headrest includes a headrest support and a multi-cam release mechanism mounted to the headrest support. The multi-cam release mechanism includes a first cam and a second cam. A headrest shell member is pivotally mounted to the headrest support through the multi-cam release mechanism. An actuator is mounted to the headrest shell member. The actuator includes a first actuator portion operable to disengage the multi-cam release mechanism based on a first input and a second actuator portion operable to disengage the multi-cam release mechanism based on a second input that is distinct from the first input allowing the multi-actuator capable vehicle headrest to transition between a deployed configuration and a folded configuration.

18 Claims, 13 Drawing Sheets

(56) References Cited

U.S. PATENT DOCUMENTS

| | | | | |
|---|---|---|---|---|
| 2014/0333098 A1* | 11/2014 | DeForest | ............... | B60N 2/206 |
| | | | | 297/463.1 |
| 2015/0232002 A1* | 8/2015 | Little | .................... | B60N 2/844 |
| | | | | 297/408 |
| 2015/0266401 A1 | 9/2015 | Grable | | |
| 2015/0343928 A1* | 12/2015 | Nilsson | ................. | B60N 2/859 |
| | | | | 297/408 |
| 2017/0028884 A1* | 2/2017 | Kapusky | ................ | B60N 2/856 |
| 2017/0158101 A1* | 6/2017 | Little | .................... | B60N 2/853 |
| 2018/0072203 A1* | 3/2018 | Purves | ................... | B60N 2/844 |
| 2018/0111521 A1* | 4/2018 | Imayou | .................. | B60N 2/844 |
| 2021/0009020 A1 | 1/2021 | Jang et al. | | |
| 2021/0370816 A1* | 12/2021 | Gummin | ................ | B60N 2/853 |
| 2022/0258656 A1* | 8/2022 | Little | .................... | B60N 2/844 |
| 2023/0302980 A1 | 9/2023 | Reader | | |

* cited by examiner

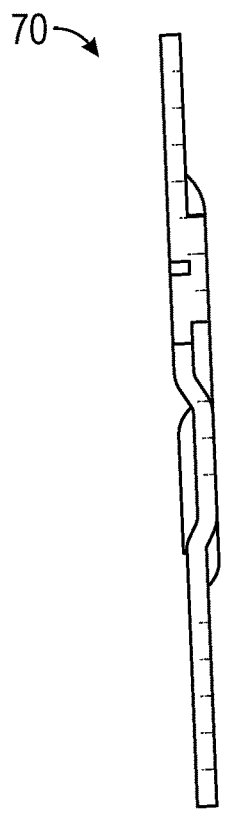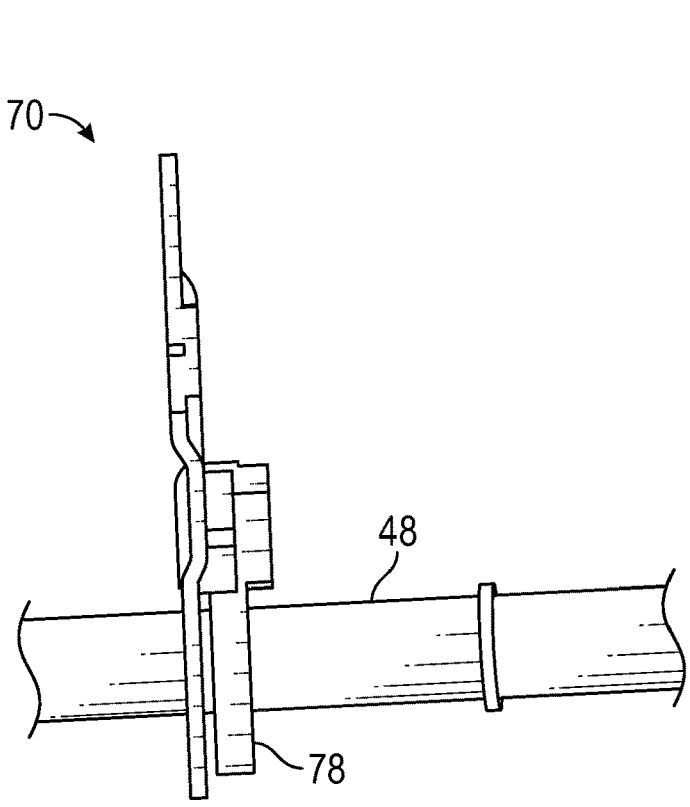
FIG. 15  FIG. 16
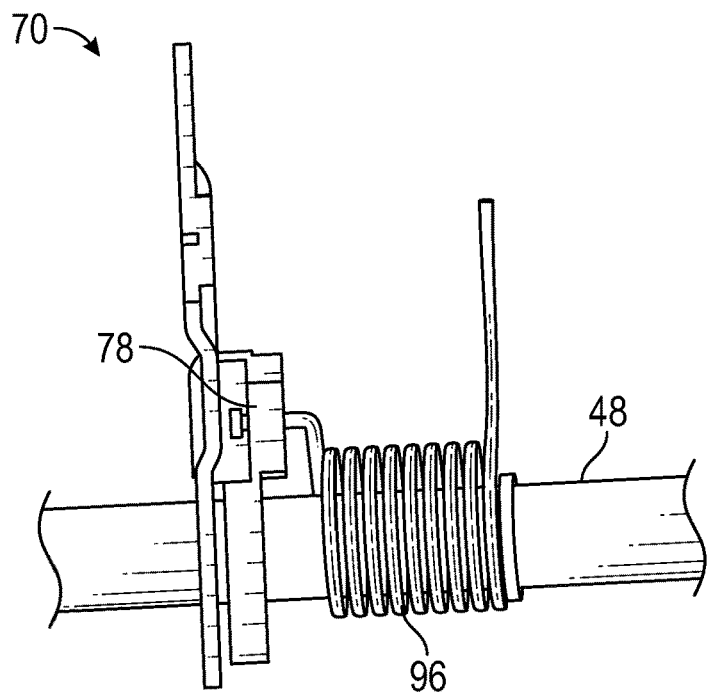
FIG. 17

MULTI-ACTUATOR CAPABLE HEADREST

INTRODUCTION

The subject disclosure relates to the art of vehicles and, more particularly, to a multi-actuator capable headrest for a vehicle.

Most motor vehicles that include front and rear row seating include headrests on rear seat backs. The headrests provide support to passenger physiology in response to forces that may be applied to a rear of the vehicle. In some configurations, headrests may be removed. An actuator may be arranged at a headrest support that, when engaged, allows the headrest to be removed from the seat back. Removal of the headrest may provide an enhanced view through a window at a rear of the vehicle.

In certain configurations, rear seat backs are reconfigurable. That is, rear seat backs may be folded forward to provide different storage capabilities and such. In such cases, the rear headrest may be removed in order to allow the seatback to fully fold forward. In other cases, the rear headrest may fold to accommodate a full folding of the rear seat back. Mechanisms for releasing the headrest include pull straps that release a pin. Once released, the headrest may rotate forward.

SUMMARY

Disclosed is a multi-actuator capable vehicle headrest including a first seat back support, a second seat back support spaced from the first seat back support, a headrest support extending between the first seat back support and the second seat back support, and a multi-cam release mechanism mounted to the headrest support. The multi-cam release mechanism includes a first cam and a second cam. A headrest shell member is pivotally mounted to the headrest support through the multi-cam release mechanism. An actuator is mounted to the headrest shell member. The actuator includes a first actuator portion operable to disengage the multi-cam release mechanism based on a first input and a second actuator portion operable to disengage the multi-cam release mechanism based on a second input that is distinct from the first input allowing the multi-actuator capable vehicle headrest to transition between a deployed configuration and a folded configuration.

In addition to one or more of the features described herein the actuator comprises a bell crank including a first end defining the first actuator portion, a second end defining the second actuator portion, and an intermediate portion including a mount defining an axis of rotation for the bell crank.

In addition to one or more of the features described herein a connecting rod extends between the second actuator portion and the multi-cam release mechanism.

In addition to one or more of the features described herein the first cam member is connected to the connecting rod and selectively disengages the second cam member to release the multi-actuator capable vehicle headrest.

In addition to one or more of the features described herein a connector element is fixedly connected to the headrest support and the headrest shell member.

In addition to one or more of the features described herein a biasing element is fixedly connected to the headrest support, the biasing element including a first cam surface that is engaged by the first cam member and a second cam surface that is engaged by the second cam member to selectively retain the multi-actuator capable vehicle headrest in the deployed configuration.

In addition to one or more of the features described herein the first cam member includes a first cam portion and the second cam member includes a second cam portion, the first cam portion engaging the first cam surface, and the second cam portion engaging the second cam surface to retain the head rest in the deployed configuration.

In addition to one or more of the features described herein the first cam portion and the first cam surface include a substantially 0° cam angle and the second cam portion and the second cam surface include a non-zero degree cam angle.

In addition to one or more of the features described herein a support pin extends from the connector element, the first cam member and the second cam member being rotationally supported on the support pin.

In addition to one or more of the features described herein the connecting rod includes a first end and a second end, the first end including a ball and a projection that extends radially outwardly of the first end spaced from the ball and the second end including an opening and a retainer extending across and spaced from the opening.

In addition to one or more of the features described herein the bell crank includes a counter balance arranged between the first end and the second end radially outwardly of the axis of rotation.

Also disclosed is a vehicle having a body including a passenger compartment, a seat arranged in the passenger compartment, the seat including a selectively foldable seat back, and a multi-actuator capable headrest supported by the selectively foldable seat back. The multi-actuator capable headrest includes a first seat back support extending into the selectively foldable seat back, a second seat back support spaced from the first seat back support extending into the selectively foldable seat back, a headrest support extending between the first seat back support and the second seat back support, a multi-cam release mechanism mounted to the headrest support, the multi-cam release mechanism including a first cam and a second cam, a headrest shell member pivotally mounted to the headrest support through the multi-cam release mechanism, and an actuator mounted to the headrest shell member. The actuator includes a first actuator portion operable to disengage the multi-cam release mechanism based on a first input and a second actuator portion operable to disengage the multi-cam release mechanism based on a second input that is distinct from the first input allowing the multi-actuator capable headrest to transition between a deployed configuration and a folded configuration.

In addition to one or more of the features described herein the actuator comprises a bell crank including a first end defining the first actuator portion, a second end defining the second actuator portion, and an intermediate portion including a mount defining an axis of rotation for the bell crank.

In addition to one or more of the features described herein a connecting rod extends between the second actuator portion and the multi-cam release mechanism.

In addition to one or more of the features described herein the first cam member is connected to the connecting rod and selectively disengages the second cam member to release the multi-actuator capable headrest.

In addition to one or more of the features described herein a connector element is fixedly connected to the headrest support and the headrest shell member.

In addition to one or more of the features described herein a biasing element is fixedly connected to the headrest support, the biasing element including a first cam surface that is engaged by the first cam member and a second cam surface that is engaged by the second cam member to selectively retain the multi-actuator capable headrest in the deployed configuration.

In addition to one or more of the features described herein the first cam member includes a first cam portion and the second cam member includes a second cam portion, the first cam portion engaging the first cam surface, and the second cam portion engaging the second cam surface to retain the multi-actuator capable headrest in the deployed configuration.

In addition to one or more of the features described herein the first cam portion and the first cam surface include a substantially 0° cam angle and the second cam portion and the second cam surface include a non-zero degree cam angle.

In addition to one or more of the features described herein the bell crank includes a counter balance arranged between the first end and the second end radially outwardly of the axis of rotation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 15 depicts a first step in manufacturing the multi-actuator capable headrest, in accordance with a non-limiting example;

FIG. 16 depicts a second step in manufacturing the multi-actuator capable headrest, in accordance with a non-limiting example;

FIG. 17 depicts a third step in manufacturing the multi-actuator capable headrest, in accordance with a non-limiting example;

DETAILED DESCRIPTION

Figure 1:
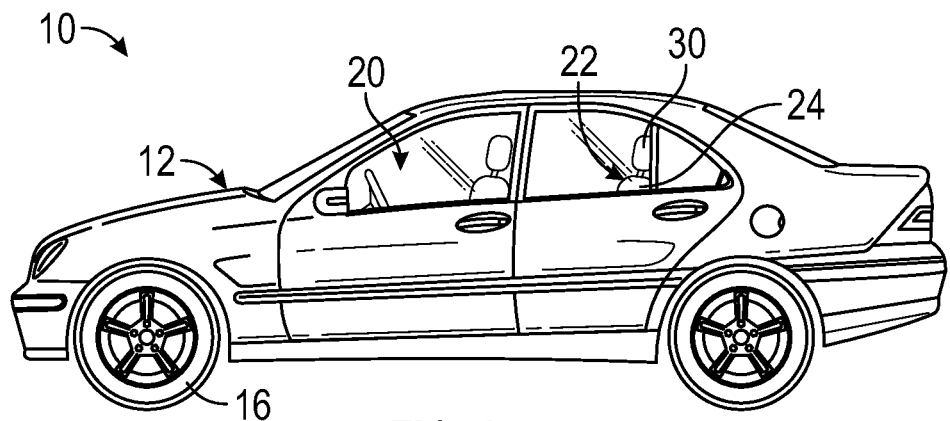
FIG. 1 depicts a vehicle including a multi-actuator capable headrest, in accordance with a non-limiting example.

The following description is merely exemplary in nature and is not intended to limit the present disclosure, its application or uses. It should be understood that throughout the drawings, corresponding reference numerals indicate like or corresponding parts and features.

Figure 2:
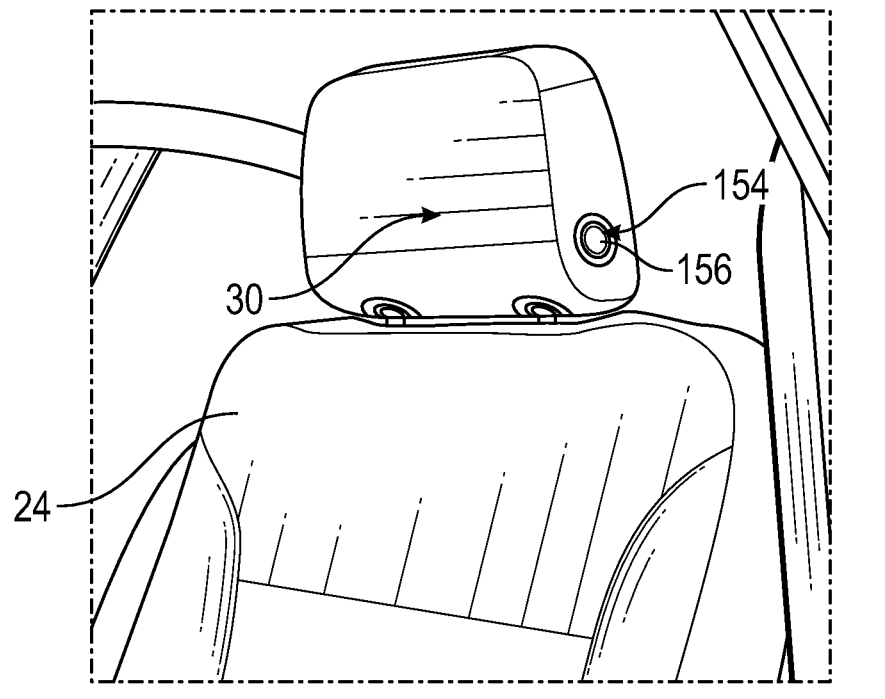
FIG. 2 depicts the multi-actuator capable headrest mounted to a foldable seatback, in accordance with a non-limiting example.

A vehicle, in accordance with a non-limiting example, is indicated generally at 10 in FIG. 1. Vehicle 10 includes a body 12 supported on a frame (not shown) and a plurality of wheels, one of which is indicated at 16. Body 12 includes a passenger compartment 20 that includes at least one seat 22. Referring to FIG. 2, seat 22 includes a foldable back 24 that supports a multi-actuator capable headrest 30. Multi-actuator capable headrest 30 may be folded forward, along with seat back 24, upon activation of one or more actuators as will be detailed herein.

Figure 3:
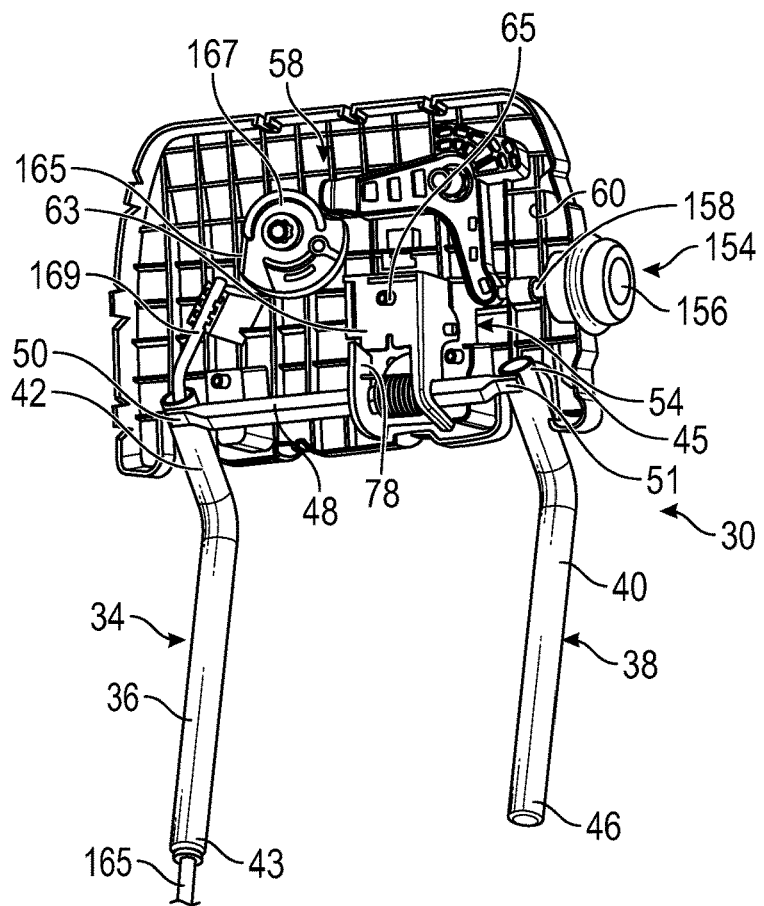
FIG. 3 is a partially disassembled view of the multi-actuator capable headrest of FIG. 2, depicting an actuator and multi-cam release mechanism mounted to a head rest shell portion, in accordance with a non-limiting example.
Figure 4:
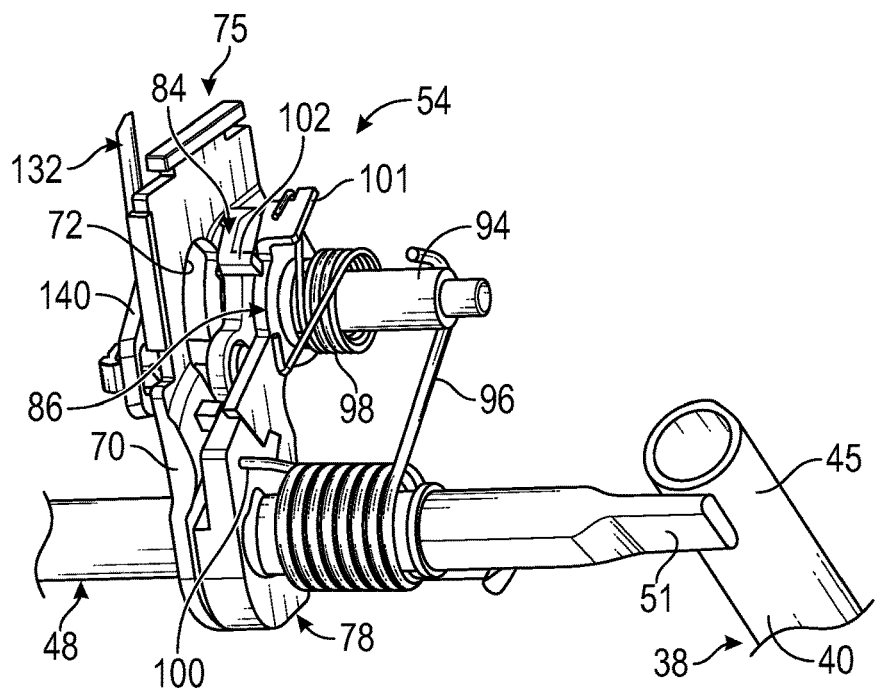
FIG. 4 depicts the multi-cam release mechanism of FIG. 3, in accordance with a non-limiting example.
Figure 6:
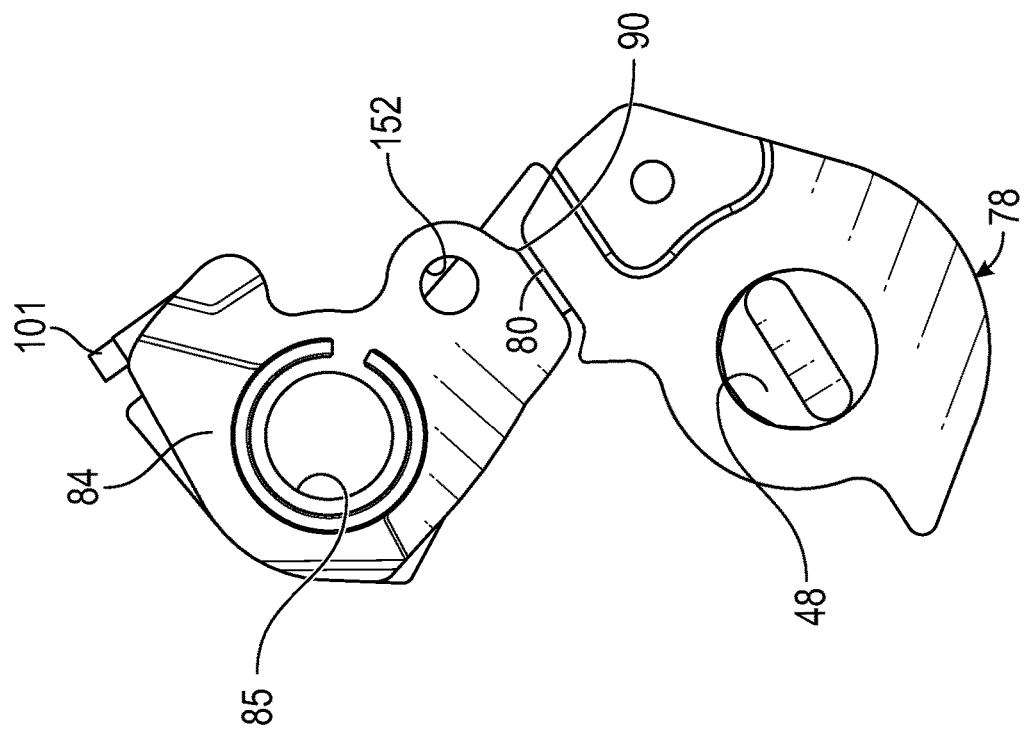
FIG. 6 depicts a side view of a first cam member interacting with a second cam member and a biasing element of the multi-cam release mechanism of FIG. 5, in accordance with a non-limiting example.
Figure 5:
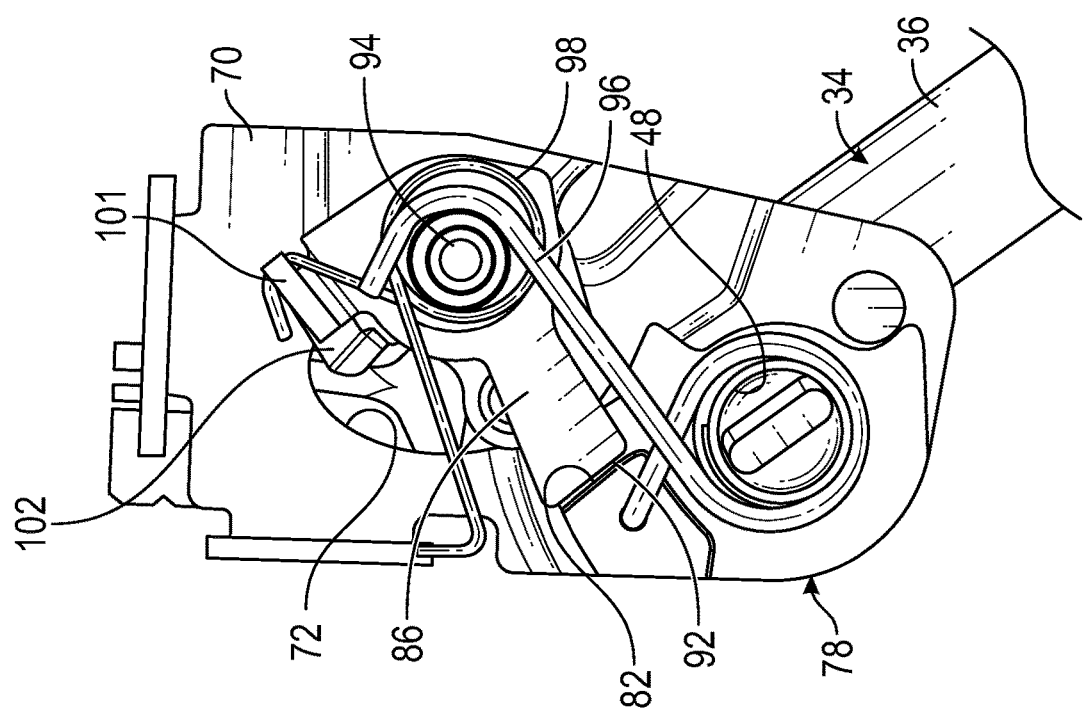
FIG. 5 depicts a side view of the multi-cam release mechanism of FIG. 3, in accordance with a non-limiting example.
Figure 8:
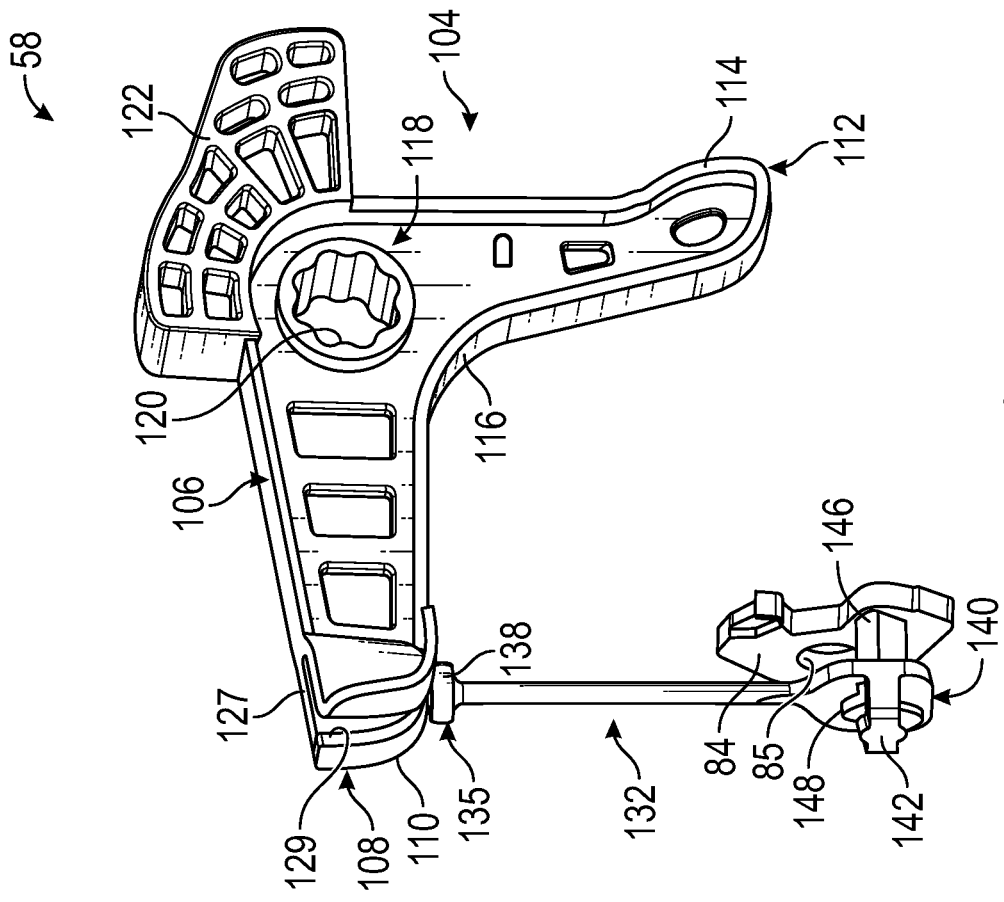
FIG. 8 depicts the actuator of FIG. 3 connected to the first cam member by a connecting rod, in accordance with a non-limiting example.
Figure 7:
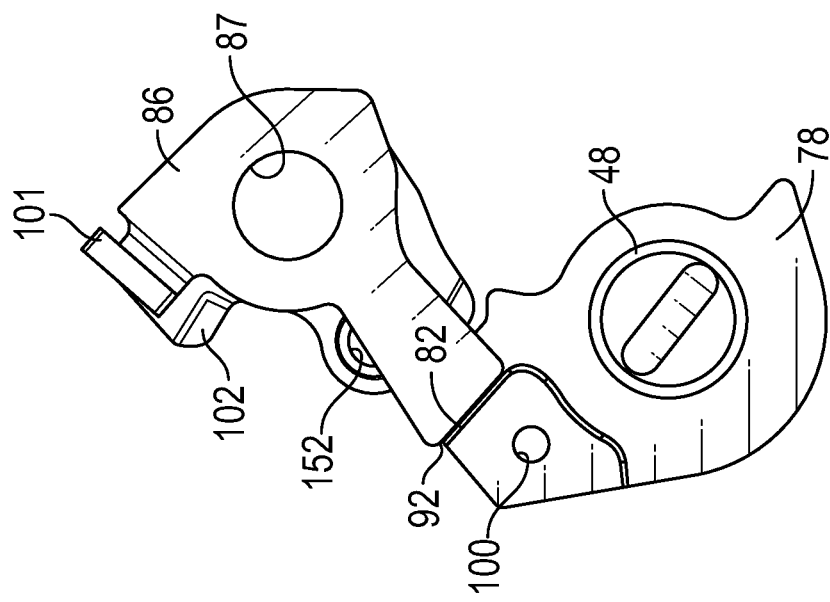
FIG. 7 is a side view of the second cam member interacting with the biasing element, in accordance with a non-limiting example.

Reference will now follow to FIG. 3 with continued reference to FIGS. 1 and 2 in describing multi-actuator capable headrest 30. Multi-actuator capable headrest 30 includes a first seat back support 34 defined by a first hollow tube 36 and a second seat back support 38 defined by a second hollow tube 40. First seat back support 34 includes a first end 42 and a second end 43. Second seat back support 38 includes a first end 45 and a second end 46. Second end 43 of first seat back support 34 and second end 46 of second seat back support 38 extend into foldable seat back 24. A headrest support 48 extends between first end 42 of first seat back support 34 and first end 45 of second seat back support 38. That is, headrest support 48 includes a first end portion 50 connected to first end 42 and a second end portion 51 coupled to first end 45.

In accordance with a non-limiting example, multi-actuator capable headrest support 30 includes a multi-cam release mechanism 54 mounted to headrest support 48 and an actuator mechanism 58 that selectively engages with multi-cam release mechanism 54 to allow multi-actuator capable headrest 30 to rotate forward. Actuator mechanism 58 is mounted to a headrest shell 60. A housing 63 connects multi-cam release mechanism 54 to headrest shell 60 with a single mechanical fastener 65. As will become more fully evident herein, the use of a single mechanical fastener to join multi-cam release mechanism 54 to headrest shell 60 reduces manufacturing steps and speeds up manufacturing time.

Reference will now follow to FIGS. 4-7 with continued reference to FIG. 3. Multi-cam release mechanism 54 includes a connector element 70 that rotates relative to headrest support 48. Connector element 70 includes a guide slot 72 which, as will be detailed herein, establishes a travel path for actuator mechanism 58. A biasing element 78 is rotationally positioned on headrest support 48 adjacent to connector element 70. Biasing element 78 promotes rotation of multi-actuator capable headrest 30 about an axis defined by headrest support 48. Biasing element 78 includes a first cam surface 80 and an opposing second cam surface 82.

Multi-cam release mechanism 54 may take the form of a dual cam system including a first cam member 84 having an opening 85 and a second cam member 86 including an opening 87. First cam member 84 includes a first cam portion 90 that selectively engages with first cam surface 80 and second cam member 86 includes a second cam portion 92 that selectively engages with second cam surface 82. First cam member 84 and second cam member 86 are positioned on a support pin 94 that extends from connector element 70 through openings 85 and 87.

Multi-cam release mechanism 54 includes a first spring member 96 and a second spring member 98. First spring member 96 coils about headrest support 48 and includes a first end (not separately labeled) that connects to a passage 100 formed in biasing element 78 and a second end (also not separately labeled) that engages support pin 94. A second spring member 98 is connected between a projection 101 on second cam member 86 and connector element 70. First cam member 84 includes a projection portion 102 that engages projection 101. That is, when first cam member 84 is rotated such that first cam portion 90 disengages from first cam surface 80 projection portion 102 acts upon projection 101 to selectively rotate second cam member 86 and disengage second cam portion 92 from second cam surface 82 allowing multi-actuator capable headrest to rotate.

First cam surface 80 and first cam portion 90 include a substantially 0° degree angle and second cam surface 82 and second cam portion 92 include a non-zero angle. In this manner, multi-actuator capable headrest 30 is secured in a non-rotated or deployed configuration such as shown in FIG. 2 and may be easily rotated to a non-deployed configuration without a large force input as will be detailed more fully herein.

Reference will now follow to FIGS. 8-11, with continued reference to FIGS. 4-7 in describing actuator mechanism 58 in accordance with a non-limiting example. Actuator mechanism 58 includes an actuator 104 that may take the form of a bell crank 106. Actuator 104 includes a first end 108 defining a first actuator portion 110, a second end 112 defining a second actuator portion 114, and an intermediate portion 116 that defines a mount 118 having an opening 120 that engages with a rotating member (not separately labeled) supported on headrest shell 60. Actuator 104 also includes a dynamic counter balance 122. Dynamic counter balance 122 is sized and positioned so as to prevent actuation of actuator mechanism 58 when multi-actuator capable headrest 30 experiences high acceleration forces.

Figure 10:
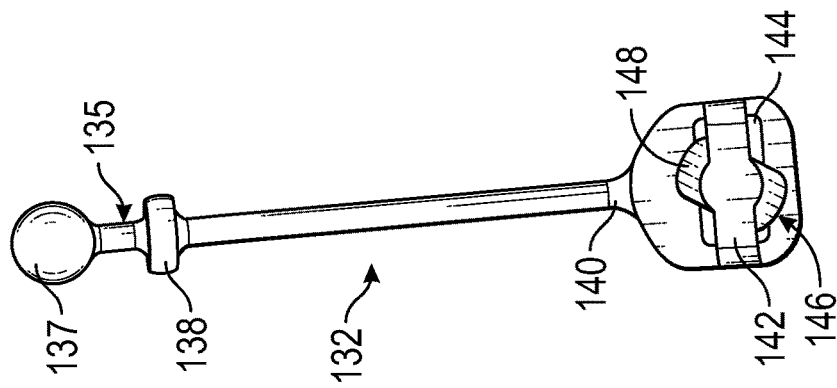
FIG. 10 depicts the connecting rod of FIG. 8 depicting a connector pin supported at a first end of the connecting rod of FIG. 9, in accordance with a non-limiting example.
Figure 9:
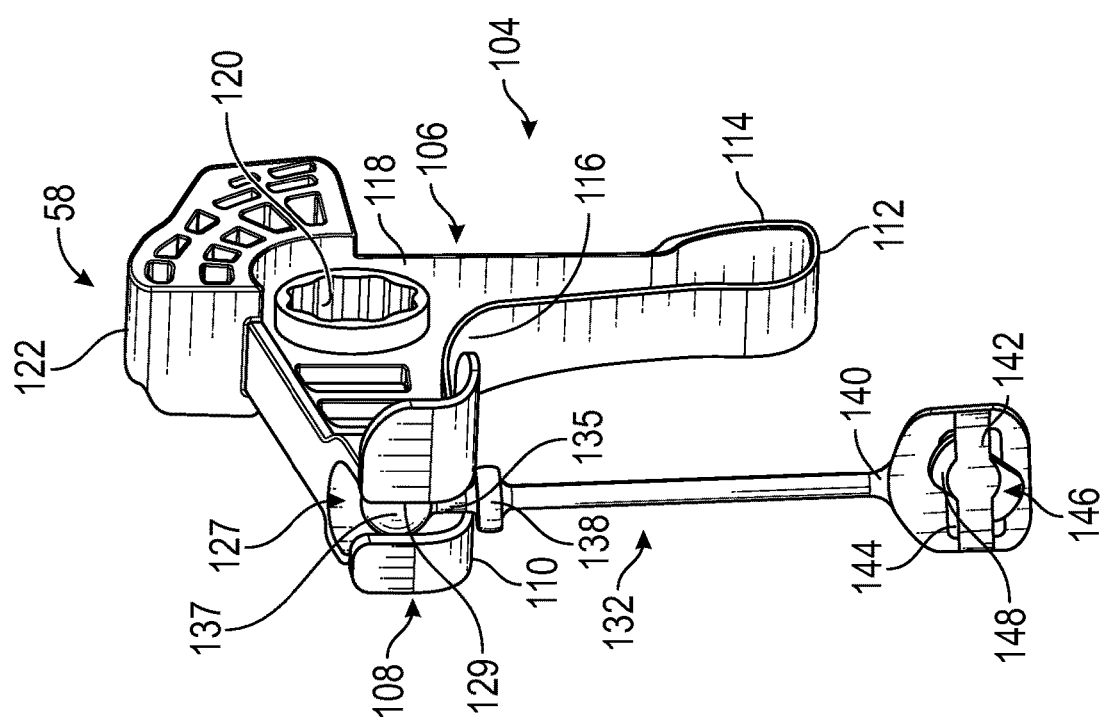
FIG. 9 depicts the connecting rod connected to the actuator of FIG. 8, in accordance with a non-limiting example.
Figure 11:
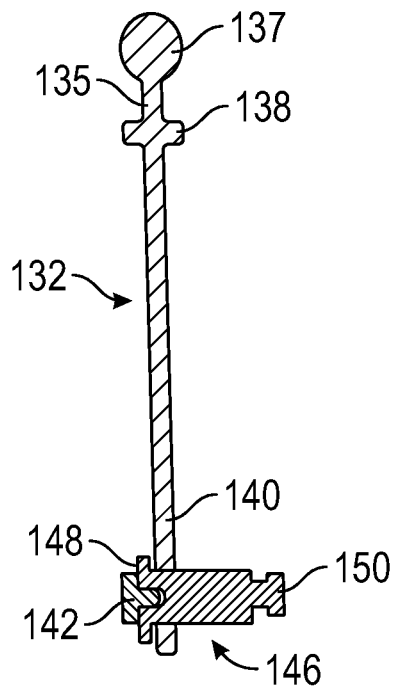
FIG. 11 is a partial cross-sectional side view of the connector pin of FIG. 10, in accordance with a non-limiting example.

In accordance with a non-limiting example, actuator 104 includes a socket 127 and a slot 129 at first end 108. Socket 127 and slot 129 are arranged so as to accommodate a connection to a connecting rod 132. Connecting rod 132 includes a first end 135 including a ball 137 that may moveably nest within socket 127 forming an articulating joint (FIG. 9) and a projection 138 spaced from ball 137. The incorporation of ball 137 and projection 138 allows connecting rod 132 to act on first end 108 in compression, through projection 138, and in tension, through ball 137. Connecting rod 132 also includes a second end 140 that connects with first cam member 84. (FIG. 8) As shown in FIGS. 10 and 11, a retainer 142 is provided at second end 140. Retainer 142 extends across an opening 144 formed in second end 140 forming a basket. Second end 140 is secured to first cam member 84 via a guide pin 146 having a base 148 and a snap connector 150 that extends into an opening 152 (FIG. 6) formed in first cam 84. Retainer 142 traps guide pin 146 in opening 144. Base 148 may be accommodated by openings 144. After being inserted, guide pin 146 may be rotated to capture base 148 between second end 140 and retainer 142. Guide pin 146 is passed through guide slot 72 in connector element 170 and is coupled to first cam member 84 via snap connector 150.

Figure 12:
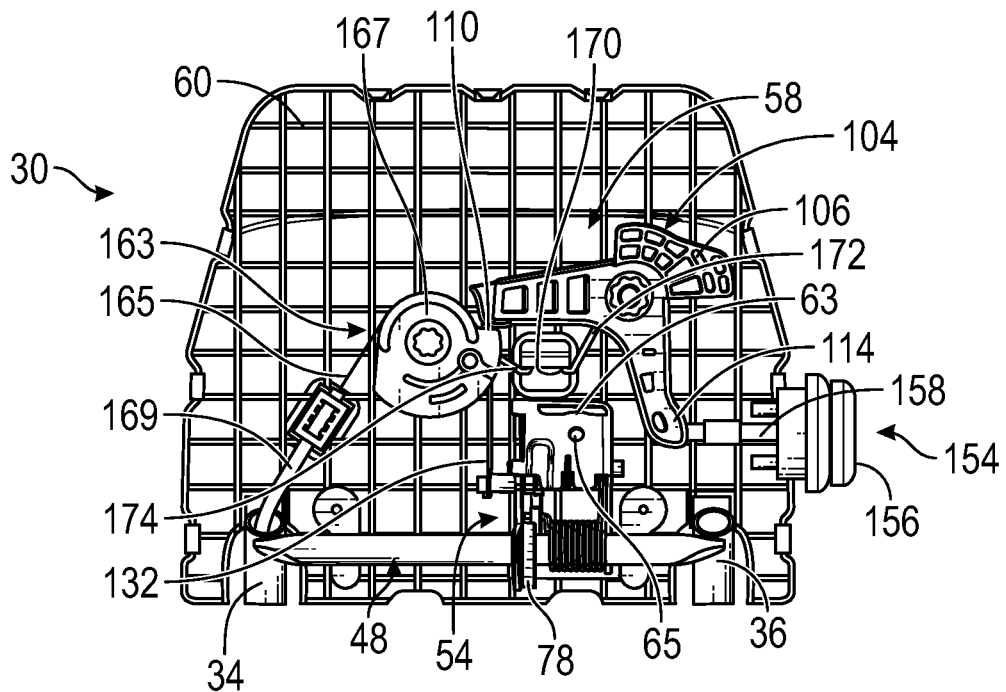
FIG. 12 depicts the headrest shell of FIG. 3 including first actuator member and second actuator member, in accordance with a non-limiting example.
Figure 13:
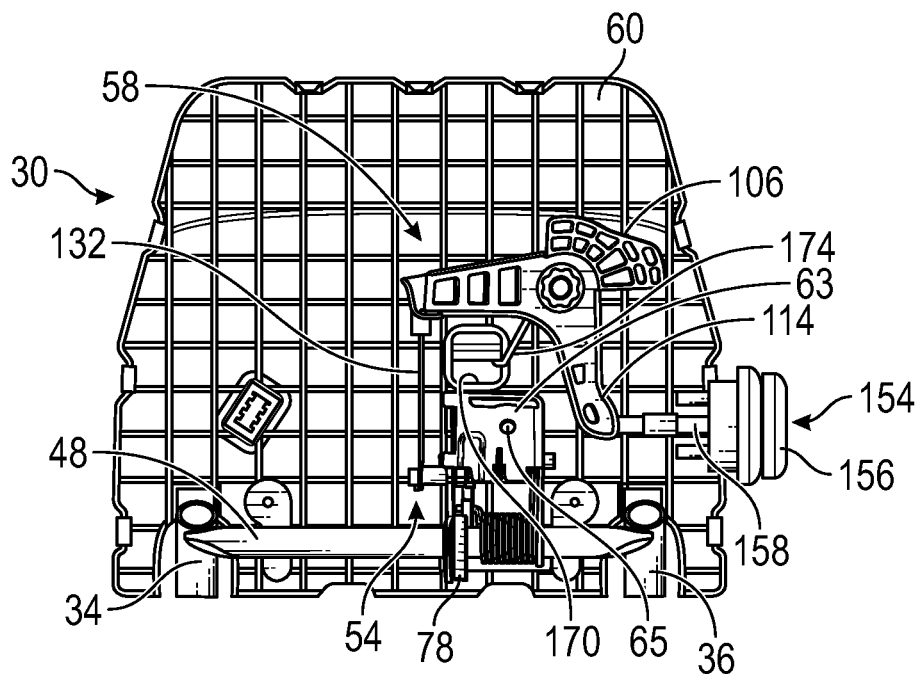
FIG. 13 depicts the headrest shell of FIG. 3 with only the first actuator member, in accordance with a non-limiting example.
Figure 14:
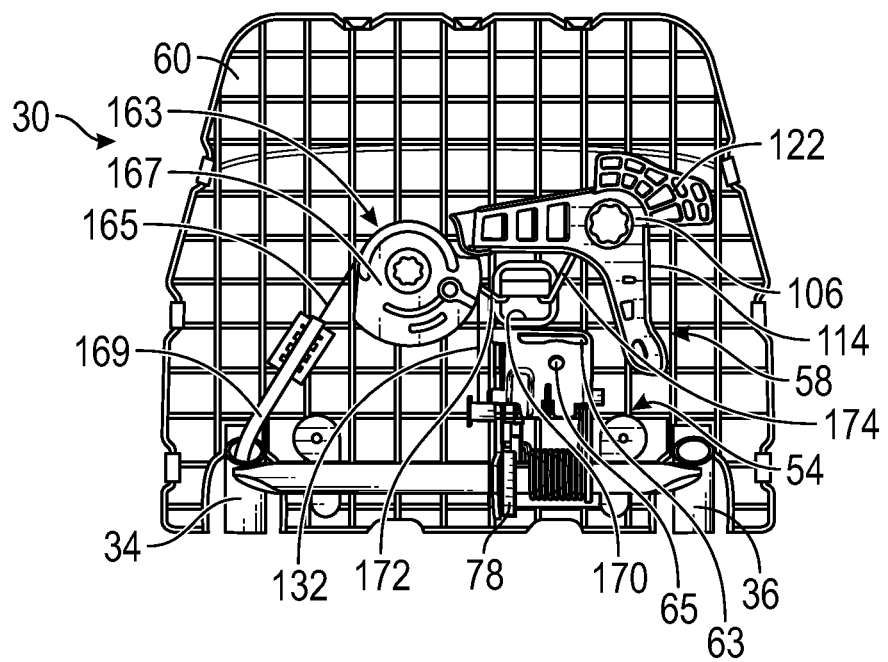
FIG. 14 depicts the headrest of FIG. 3 with only the second actuator member, in accordance with a non-limiting example.
Figure 18:
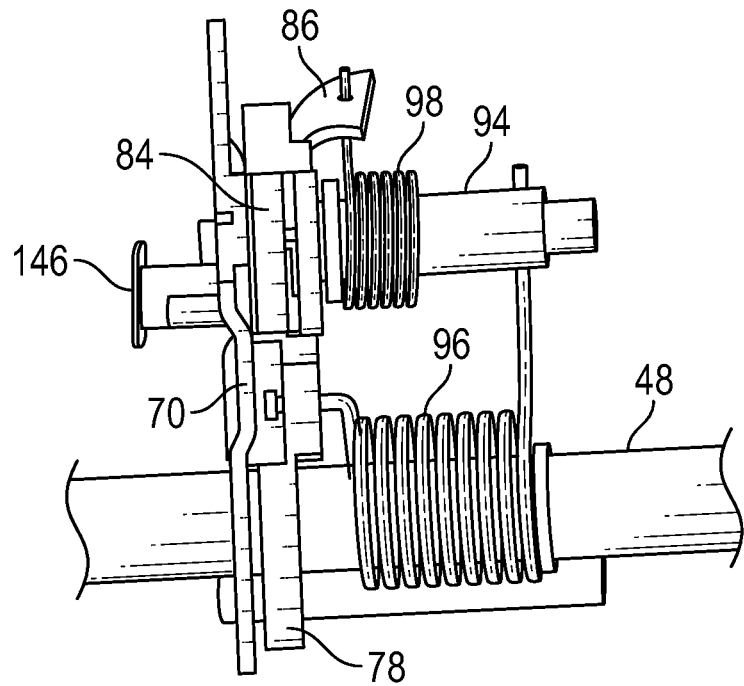
FIG. 18 depicts a fourth step in manufacturing the multi-actuator capable headrest, in accordance with a non-limiting example.

In accordance with a non-limiting example depicted in FIGS. 12-14, and with continued reference to FIGS. 4-9, multi-actuator capable headrest 30 may accommodate one, another, or two different actuators. In FIG. 12, multi-actuator capable headrest 30 includes a first actuator member 154 that is shown in the form of a button 156. An actuator element 158 extends between button 156 and second actuator portion 114. With this arrangement, a first input to button 156 causes actuator 104 to rotate about mount 118 such that connecting rod 132 raises and rotates first cam member 84. First cam portion 90 disengages from first cam surface 80 as first cam member 84 rotates. Projection portion 102 engages projection 101 imparting a rotational force to second cam member 86. Second cam portion 92 disengages from second cam surface 82 releasing biasing element 78 such that first spring member 96 provides a biasing force causing multi-actuator capable headrest 30 to rotate about headrest support 48.

Multi-actuator capable headrest 30 is also shown to include a second actuator member 163 including a cable 165 that extends through first seat back support 34 to a pulley 167. A second input, such as tension imparted to cable 165, causes pulley 167 to rotate and engage first actuator portion 110 causing actuator 104 to rotate about mount 118 activating multi-cam release mechanism 54 such that multi-actuator capable headrest 30 may rotate forward. Cable 165 may extend through a conduit 169 across a portion of headrest shell 60. Cable 165 may include a manual pull (not shown) or be connected in such a way such that rotating foldable seat back 24 forward automatically releases multi-actuator capable headrest 30.

In a non-limiting example, headrest shell 60 may include an inspection window 170 that accommodates a visual check during manufacturing. That is, inspection window 170 allows inspectors to check that a first return spring 172 associate with bell crank 106 and a second return spring 174 associated with pulley 167 are installed. First return spring 172 biases bell crank 106 to a neutral position. Likewise, second return spring 174 biases pulley 167 to a neutral position.

In FIG. 13, multi-actuator capable headrest 30 is only provided with first actuator member 154. In FIG. 14, multi-actuator capable headrest 30 is only provided with second actuator member 163. The non-limiting examples provide various configurations that may be tailored to specific vehicle models and trim packages. Further, the non-limiting examples provide for cost effective high volume production with only minor modifications to transition between different models as shown in FIGS. 15-24.

Figure 19:
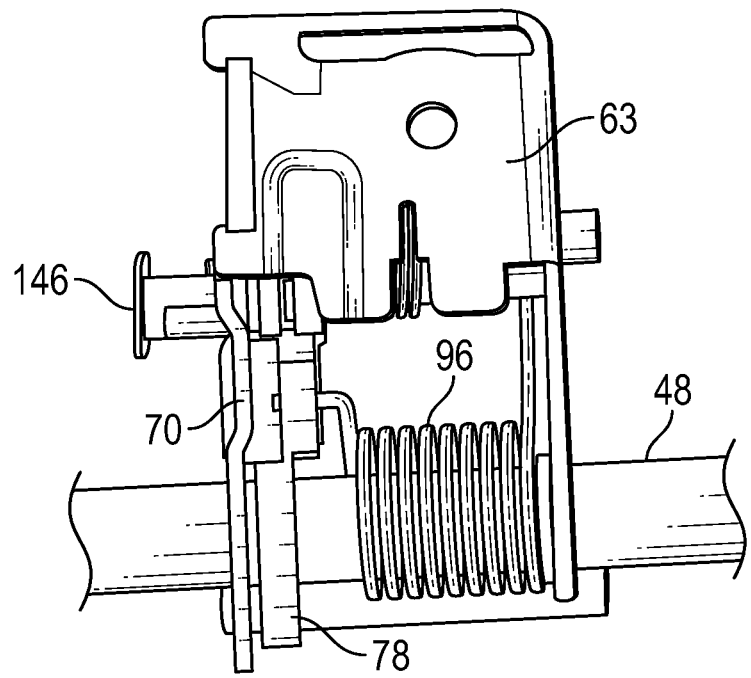
FIG. 19 depicts a fifth step in manufacturing the multi-actuator capable headrest, in accordance with a non-limiting example.
Figure 20:
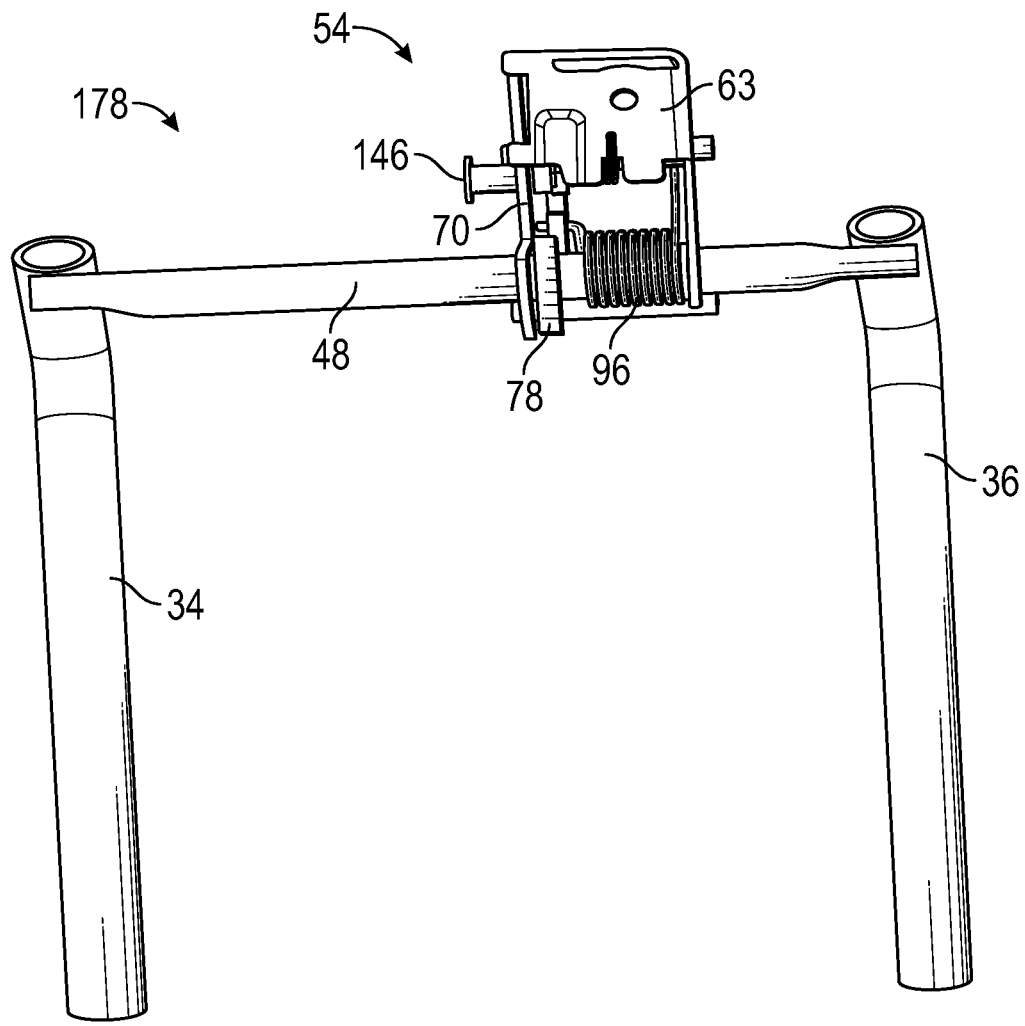
FIG. 20 depicts a sixth step in manufacturing the multi-actuator capable headrest, in accordance with a non-limiting example.

In FIG. 15, connector element 70 is prepared and fixedly connected to headrest support 48 with biasing element 78 as shown in FIG. 16. In FIG. 17 first spring member 96 is installed and, in FIG. 18, first cam member 84, second cam member 86 and support pin 94 along with second spring member 98 are installed. In FIG. 19, housing 63 is mounted and a headrest subassembly 178 is formed by connecting headrest support 48 to first seat back support 34 and second seat back support 38 as shown in FIG. 20.

Figure 21:
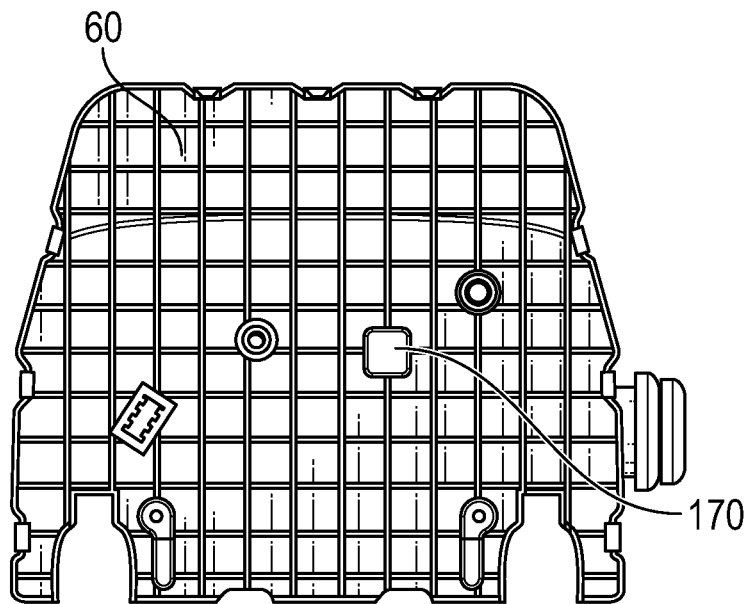
FIG. 21 depicts a seventh step in manufacturing the multi-actuator capable headrest, in accordance with a non-limiting example.
Figure 22:
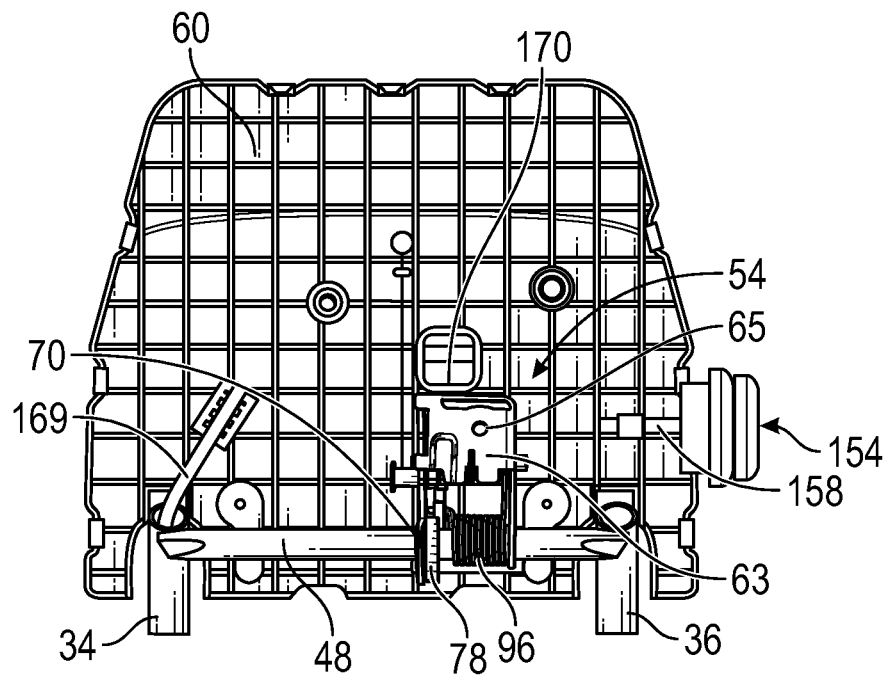
FIG. 22 depicts an eighth step in manufacturing the multi-actuator capable headrest, in accordance with a non-limiting example.
Figure 23:
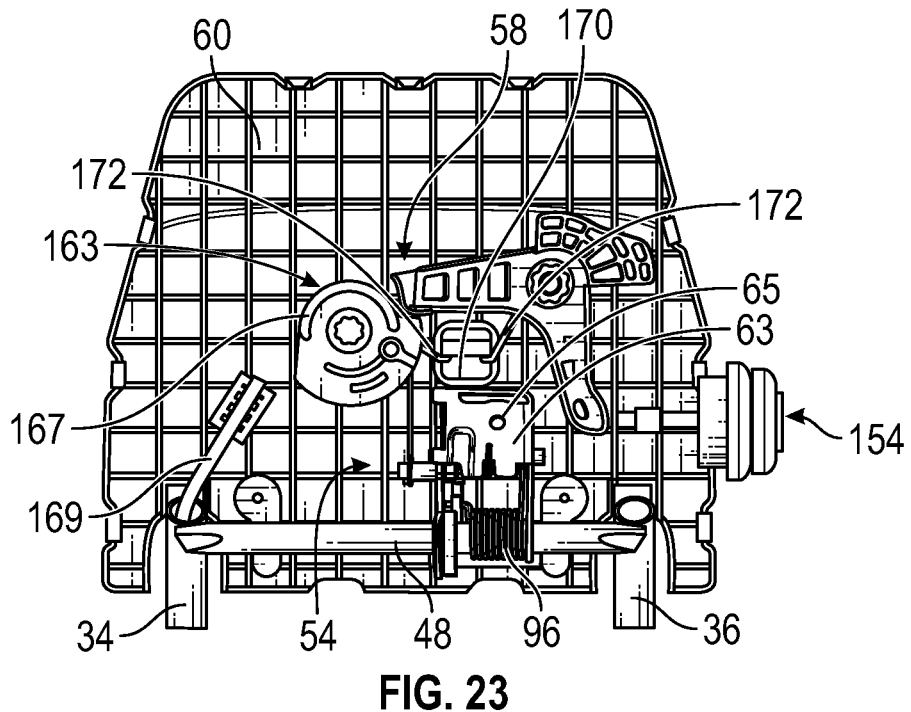
FIG. 23 depicts a ninth step in manufacturing the multi-actuator capable headrest, in accordance with a non-limiting example.
Figure 24:
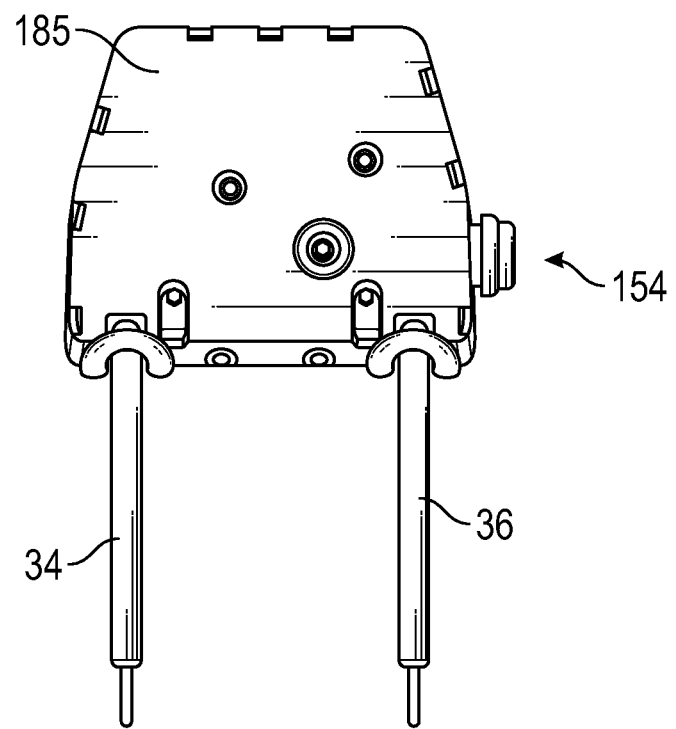
FIG. 24 depicts a tenth step in manufacturing the multi-actuator capable headrest, in accordance with a non-limiting example.

In FIG. 21, headrest shell 60 is prepared and in FIG. 22, headrest subassembly is mounted by engaging single mechanical fastener 65 (FIG. 3) through housing. At this point, actuator mechanism may be mounted. FIG. 23 depicts the incorporation of first actuator member 154 and second actuator member 163. In FIG. 24, a second headrest shell 185 is connected to headrest shell 60. At this point, a covering may be applied and multi-actuator capable headrest installed in vehicle 10. It should be understood that headrest shell 60 and second headrest shell 187 may have various widths and heights so as to be configured for different vehicle models and trim packages.

Figure 25:
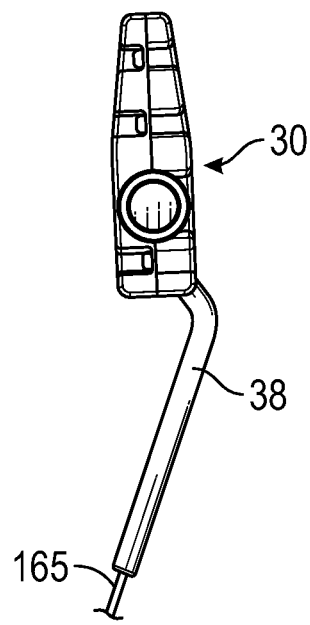
FIG. 25 depicts a side view of a multi-actuator capable headrest, in accordance with a non-limiting example.
Figure 26:
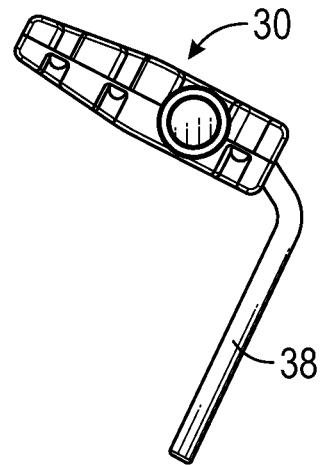
FIG. 26 depicts the a multi-actuator capable headrest of FIG. 25 configured for a first fold angle, in accordance with a non-limiting example.
Figure 27:
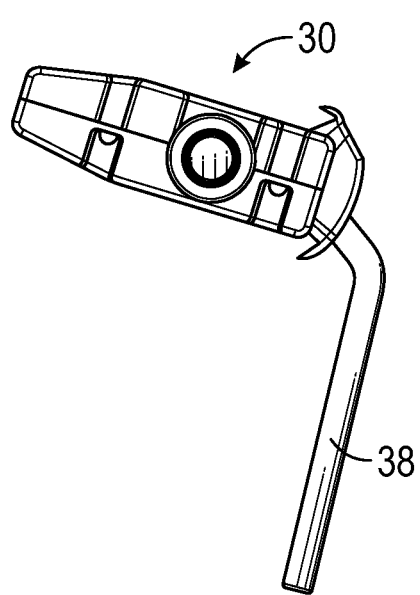
FIG. 27 depicts the a multi-actuator capable headrest of FIG. 25 configured for a second fold angle, in accordance with a non-limiting example.
Figure 28:
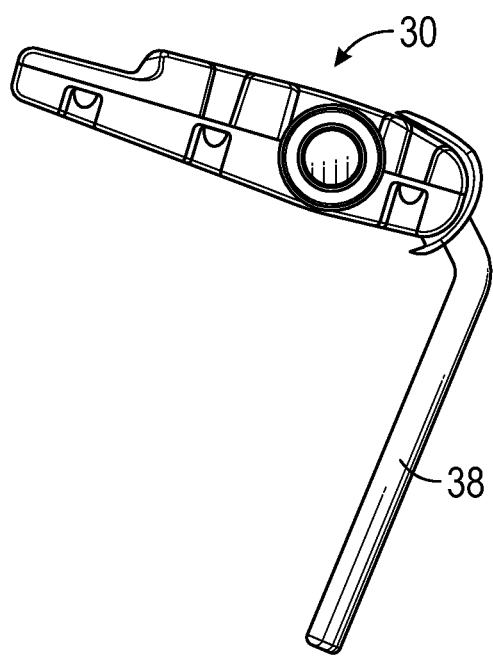
FIG. 28 depicts the a multi-actuator capable headrest of FIG. 25 configured for a third fold angle, in accordance with a non-limiting example.

At this point, it should be understood that the non-limiting examples describe a multi-actuator capable headrest that is easily manufactured and adaptable to various configuration including one, another, or two actuator modes. Further, the multi-actuator capable head rest may be readily configured for different fold angles. That is, multi-actuator capable headrest may transition from a non-deployed configuration such as shown in FIG. 25, to a folded configuration having a selected fold angle. That is, by changing the connecting rod, multi-actuator headrest may be configured for a 67° fold angle such as shown in FIG. 26; a 72° fold angle such as shown in FIG. 27; or a 90° fold angle such as shown in FIG. 28.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A multi-actuator capable vehicle headrest comprising:
a first seat back support;
a second seat back support spaced from the first seat back support;
a headrest support extending between the first seat back support and the second seat back support;
a multi-cam release mechanism mounted to the headrest support, the multi-cam release mechanism including a first cam and a second cam;
a biasing element connected to the headrest support, the biasing element including a first cam surface that is engaged by the first cam and a second cam surface that is engaged by the second cam to selectively retain the multi-actuator capable vehicle headrest in the deployed configuration;
a headrest shell member pivotally mounted to the headrest support through the multi-cam release mechanism; and
an actuator rotatably mounted to the headrest shell member, the actuator including a first actuator portion operable to disengage the multi-cam release mechanism based on a first input and a second actuator portion operable to disengage the multi-cam release mechanism based on a second input that is distinct from the first input allowing the multi-actuator capable vehicle headrest to transition between a deployed configuration and a folded configuration.

2. The multi-actuator capable vehicle headrest according to claim 1, wherein the actuator comprises a bell crank including a first end defining the first actuator portion, a second end defining the second actuator portion, and an intermediate portion including a mount defining an axis of rotation for the bell crank.

3. The multi-actuator capable vehicle headrest according to claim 2, further comprising a connecting rod extending between the second actuator portion and the multi-cam release mechanism.

4. The multi-actuator capable vehicle headrest according to claim 3, wherein the first cam is connected to the connecting rod and selectively disengages the second cam to release the multi-actuator capable vehicle headrest.

5. The multi-actuator capable vehicle headrest according to claim 4, further comprising: a connector element connected to the headrest support and the headrest shell member.

6. The multi-actuator capable vehicle headrest according to claim 1, wherein the first cam includes a first cam portion and the second cam includes a second cam portion, the first cam portion engaging the first cam surface, and the second cam portion engaging the second cam surface to retain the head rest in the deployed configuration.

7. The multi-actuator capable vehicle headrest according to claim 6, wherein the first cam portion and the first cam surface include a substantially 0° cam angle and the second cam portion and the second cam surface include a non-zero degree cam angle.

8. The multi-actuator capable vehicle headrest according to claim 5, further comprising a support pin extending from the connector element, the first cam and the second cam being rotationally supported on the support pin.

9. The multi-actuator capable vehicle headrest according to claim 5, wherein the connecting rod includes a first end and a second end, the first end including a ball and a projection that extends radially outwardly of the first end spaced from the ball and the second end including an opening and a retainer extending across and spaced from the opening.

10. The multi-actuator capable vehicle headrest according to claim 2, wherein the bell crank includes a counter balance arranged between the first end and the second end radially outwardly of the axis of rotation.

11. A vehicle comprising:
a body including a passenger compartment;
a seat arranged in the passenger compartment, the seat including a selectively foldable seat back; and
a multi-actuator capable headrest supported by the selectively foldable seat back, the multi-actuator capable headrest comprising:
a first seat back support extending into the selectively foldable seat back;
a second seat back support spaced from the first seat back support and extending into the selectively foldable seat back;
a headrest support extending between the first seat back support and the second seat back support;
a multi-cam release mechanism mounted to the headrest support, the multi-cam release mechanism including a first cam and a second cam;
a biasing element connected to the headrest support, the biasing element including a first cam surface that is engaged by the first cam and a second cam surface that is engaged by the second cam to selectively retain the multi-actuator capable headrest in the deployed configuration;
a headrest shell member pivotally mounted to the headrest support through the multi-cam release mechanism; and
an actuator rotatably mounted to the headrest shell member, the actuator including a first actuator portion operable to disengage the multi-cam release mechanism based on a first input and a second actuator portion operable to disengage the multi-cam release mechanism based on a second input that is distinct from the first input allowing the multi-actuator capable headrest to transition between a deployed configuration and a folded configuration.

12. The vehicle according to claim 11, wherein the actuator comprises a bell crank including a first end defining the first actuator portion, a second end defining the second actuator portion, and an intermediate portion including a mount defining an axis of rotation for the bell crank.

13. The vehicle according to claim 12, further comprising a connecting rod extending between the second actuator portion and the multi-cam release mechanism.

14. The vehicle according to claim 13, wherein the first cam is connected to the connecting rod and selectively disengages the second cam to release the multi-actuator capable headrest.

15. The vehicle according to claim 14, further comprising:
a connector element connected to the headrest support and the headrest shell member.

16. The vehicle according to claim 11, wherein the first cam includes a first cam portion and the second cam includes a second cam portion, the first cam portion engaging the first cam surface, and the second cam portion engaging the second cam surface to retain the multi-actuator capable headrest in the deployed configuration.

17. The vehicle according to claim 16, wherein the first cam portion and the first cam surface include a substantially 0° cam angle and the second cam portion and the second cam surface include a non-zero degree cam angle.

18. The vehicle according to claim 12, wherein the bell crank includes a counter balance arranged between the first end and the second end radially outwardly of the axis of rotation.

* * * * *